(12) United States Patent
Kardos et al.

(10) Patent No.: US 8,316,805 B2
(45) Date of Patent: Nov. 27, 2012

(54) COOLING ARRANGEMENT FOR AIR OR GAS INPUT IN A VEHICLE ENGINE

(75) Inventors: Zoltan Kardos, Södertälje (SE); Erik Söderberg, Stockholm (SE); Hans Wikström, Johanneshov (SE)

(73) Assignee: Scania CV AB (SE)

( * ) Notice: Subject to any disclaimer, the term of this patent is extended or adjusted under 35 U.S.C. 154(b) by 614 days.

(21) Appl. No.: 12/529,383

(22) PCT Filed: Mar. 10, 2008

(86) PCT No.: PCT/SE2008/050262
§ 371 (c)(1),
(2), (4) Date: Sep. 1, 2009

(87) PCT Pub. No.: WO2008/111906
PCT Pub. Date: Sep. 18, 2008

(65) Prior Publication Data
US 2010/0089088 A1 Apr. 15, 2010

(30) Foreign Application Priority Data
Mar. 15, 2007 (SE) ...................................... 0700653

(51) Int. Cl.
*B60K 11/04* (2006.01)
(52) U.S. Cl. ............. 123/41.04; 123/41.51; 123/568.11; 180/68.1; 180/68.2
(58) Field of Classification Search ............... 123/41.04, 123/41.51, 196 AB, 568.11, 568.12; 180/68.1, 180/68.2
See application file for complete search history.

(56) References Cited

U.S. PATENT DOCUMENTS

| 3,964,449 | A | | 6/1976 | Thien et al. |
| 4,120,271 | A | | 10/1978 | Edmaier |
| 4,476,820 | A | * | 10/1984 | Nixon ........................ 123/41.05 |
| 6,244,256 | B1 | * | 6/2001 | Wall et al. ................ 123/568.12 |
| 6,854,544 | B2 | * | 2/2005 | Vide ............................ 180/68.6 |
| 6,973,787 | B2 | * | 12/2005 | Klingel .......................... 60/612 |

(Continued)

FOREIGN PATENT DOCUMENTS
GB     2002704 A    2/1979

OTHER PUBLICATIONS

International Search Report dated May 30, 2008, issued in corresponding international application No. PCT/SE2008/050262.

*Primary Examiner* — Noah Kamen
*Assistant Examiner* — Grant Moubry
(74) *Attorney, Agent, or Firm* — Ostrolenk Faber LLP

(57) ABSTRACT

The present invention relates to a cooler arrangement in a vehicle powered by a combustion engine. The cooler arrangement comprises a first cooling element for cooling a first medium in the form of a circulating coolant, and a radiator fan adapted to generating an air flow through the first cooling element for cooling the coolant when it circulates through the first cooling element. The cooler arrangement comprises also a tubular casing adapted to serving as a flow passage for the air which passes through the first cooling element and at least one further cooling element for cooling a second medium, which further cooling element is arranged in the flow passage at a position downstream of the first cooling element with respect to the intended direction of flow of the cooling air through the flow passage.

17 Claims, 1 Drawing Sheet

U.S. PATENT DOCUMENTS

| | | | |
|---|---|---|---|
| 7,059,308 B2 * | 6/2006 | Eitel et al. | 123/568.12 |
| 7,617,679 B2 * | 11/2009 | Kardos et al. | 60/605.2 |
| 7,644,793 B2 * | 1/2010 | Iwasaki et al. | 180/68.2 |
| 7,716,929 B2 * | 5/2010 | Pelz et al. | 60/605.2 |
| 7,886,726 B2 * | 2/2011 | Kardos et al. | 123/568.12 |
| 8,028,523 B2 * | 10/2011 | Wikstrom et al. | 60/605.2 |
| 2002/0189256 A1 * | 12/2002 | Kalish | 60/605.2 |
| 2005/0103013 A1 * | 5/2005 | Brookshire et al. | 60/605.2 |
| 2007/0204614 A1 * | 9/2007 | Kolb | 60/599 |
| 2007/0245716 A1 * | 10/2007 | Kardos et al. | 60/278 |
| 2008/0256949 A1 * | 10/2008 | Wikstrom et al. | 60/605.2 |

* cited by examiner

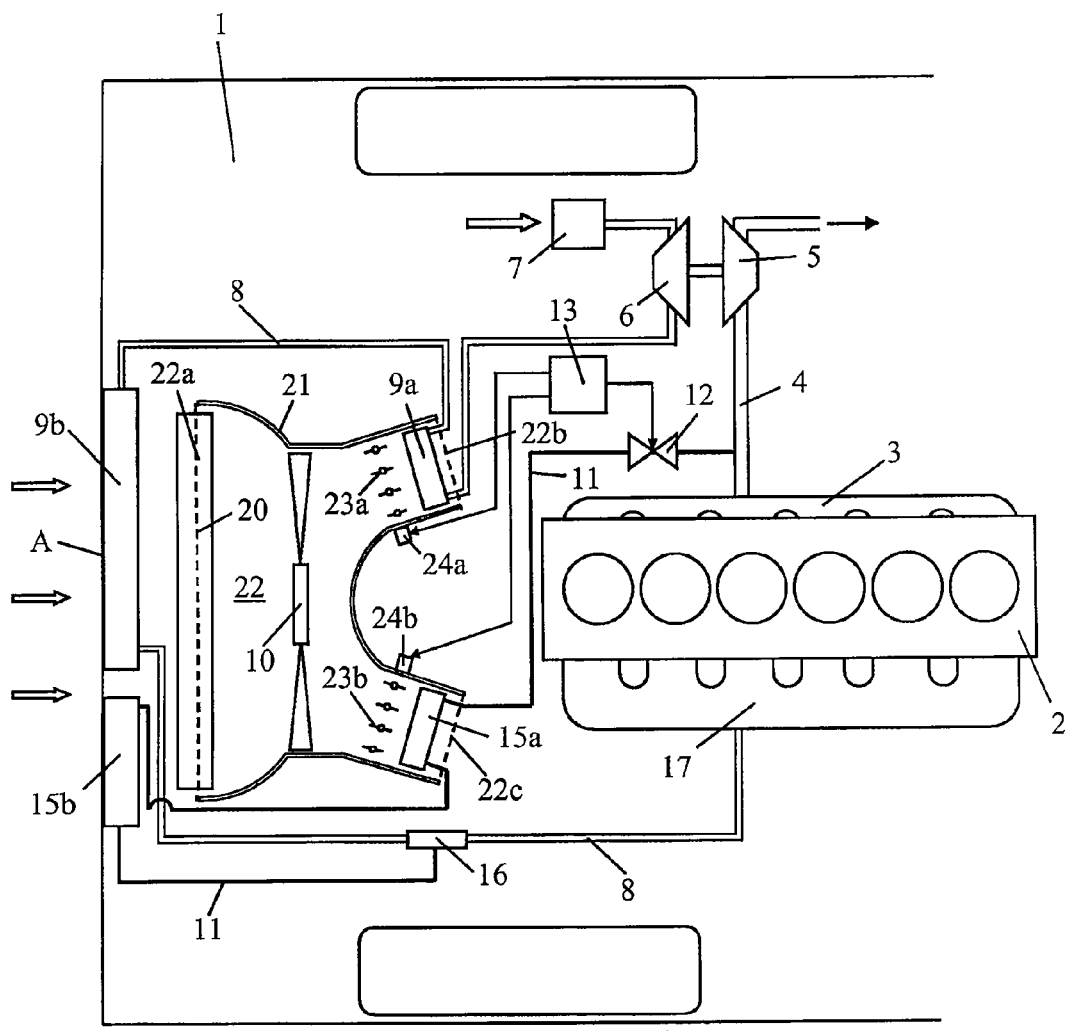

COOLING ARRANGEMENT FOR AIR OR GAS INPUT IN A VEHICLE ENGINE

CROSS REFERENCE TO RELATED APPLICATION

The present application is a 35 U.S.C. §§371 national phase conversion of PCT/SE2008/050262, filed Mar. 10, 2008, which claims priority of Swedish Application No. 0700653-9, filed Mar. 15, 2007, the disclosure of which is incorporated by reference herein. The PCT International Application was published in the English language.

BACKGROUND TO THE INVENTION AND STATE OF THE ART

The present invention relates to a cooler arrangement in a vehicle engine for air and/or gas into a combustion engine of the vehicle.

Particularly in heavy vehicles, the cooling system for cooling the combustion engine is increasingly being used for cooling other components and systems of the vehicle. If the cooling system is too heavily loaded, however, there is risk of its not coping satisfactorily with its main function of cooling the combustion engine.

The technique called EGR (exhaust gas recirculation) is a known way of leading part of the exhaust gases from a combustion process in a combustion engine back, via a return line, to an inlet line for supply of air to the combustion engine. A mixture of air and exhaust gases is thus supplied via the inlet line to the cylinders of the engine in which the combustion takes place. Adding exhaust gases to the air causes a lower combustion temperature, resulting inter alia in a reduced content of nitrogen oxides $NO_x$ in the exhaust gases. This technique is used for both Otto engines and diesel engines. However, the exhaust gases are at a relatively high temperature and have therefore to be cooled before they are led, together with the air, into the combustion spaces of the combustion engine. Conventional EGR coolers use the coolant of the vehicle's ordinary cooling system for cooling the recirculating exhaust gases.

The air led to a combustion engine is usually compressed to enable as large an amount of air as possible to be led into the combustion engine. The air undergoes heating during the compression. For an optimum amount of air to be supplied to the combustion engine, the compressed air has therefore to be cooled before it is led to the combustion engine. The compressed air is usually cooled in a charge air cooler which has air at the temperature of the surroundings flowing through it. The compressed air can thus be cooled to a temperature only a few degrees above the temperature of the surroundings. To achieve such cooling, the charge air cooler is usually situated in front of the ordinary radiator which cools the coolant. The coolant in the ordinary cooling system therefore undergoes less effective cooling when it is cooled by air which is at a higher temperature than the surroundings. The capacity of the ordinary cooling system is thus reduced when such a charge air cooler is used.

SUMMARY OF THE INVENTION

The object of the present invention is to provide a cooler arrangement in a vehicle in which various components and systems can be cooled effectively by substantially the same air as flows through the radiator of the vehicle's ordinary cooling system, without thereby appreciably impairing the capacity of the ordinary cooling system.

This object is achieved with the arrangement of the invention. A tubular casing leads all the air which has passed through the first cooling element to the further cooling element situated downstream. The cooling effect undergone by the second medium in the further cooling element depends on the temperature difference Δt between the second medium and the cooling air which flows through the further cooling element. If the second medium is at a high temperature, the result is a relatively large temperature difference even if the cooling air flow is at a somewhat higher temperature than the temperature of the surroundings. Another factor which affects the cooling effect is the amount of cooling air which flows through the further cooling element per unit time. The presence of the tubular casing thus ensures that the same large air flow which passes through the first cooling element also passes through the further cooling element. It is thus possible for there to be both a relatively large temperature difference and a large cooling air flow, resulting in good cooling of the second medium in the further cooling element. The fact that the further cooling element is situated downstream of the first cooling element does not impair at all the cooling of the coolant in the first cooling element and hence likewise does not impair the function of the vehicle's ordinary cooling system.

According to a preferred embodiment of the present invention, the further cooling element is an air-cooled EGR cooler for cooling of recirculating exhaust gases which are led from an exhaust line of the combustion engine to an inlet line for air to the combustion engine. The exhaust gases from a combustion engine are usually at a temperature of about 500-600° C. The temperature of the recirculating exhaust gases is so high that they are cooled almost as effectively by air which is at a somewhat raised temperature after it has passed through the first cooling element as by air at the temperature of the surroundings. The recirculating exhaust gases thus undergo effective cooling in said EGR cooler situated within the tubular casing. With advantage, said air-cooled EGR cooler is adapted to subjecting the returning exhaust gases to a first step of cooling, and the cooler arrangement comprises a second EGR cooler for subjecting the returning exhaust gases to a second step of cooling. Although effective cooling of the recirculating exhaust gases can be effected in said EGR cooler, the exhaust gases cannot be cooled to a temperature below the temperature of the cooling air flow within the tubular casing. Since it is often desirable to cool the exhaust gases to a temperature in the vicinity of the temperature of the surroundings, it is advantageous to use a second EGR cooler for subjecting the recirculating exhaust gases to a second step of cooling. With advantage, the second EGR cooler is so situated that it has air at the temperature of the surroundings flowing through it. In that case the second EGR cooler may be situated upstream of the first cooling element with respect to the intended direction of air flow through the first cooling element. The cooling of the coolant in the first cooling element is thereby somewhat impaired, since the cooling air flow which cools the coolant in the first cooling element will be at a somewhat raised temperature, but the temperature rise of the cooling air flow is relatively moderate, since the recirculating exhaust gases reaching the second EGR cooler will not be at too high a temperature, having already undergone the first step of cooling.

According to another embodiment of the invention, the further cooling element is an air-cooled charge air cooler for cooling of compressed air which is led to the combustion engine. After the compression, the compressed air is at a high temperature. The compressed air is therefore cooled almost as effectively by air which is at a somewhat raised temperature as by air at the temperature of the surroundings. The charge air thus undergoes effective cooling in said charge air cooler situated within the tubular casing. With advantage, said air-cooled charge air cooler is adapted to subjecting the compressed air to a first step of cooling and the cooler arrangement comprises a second charge air cooler for subjecting the compressed air to a second step of cooling. Although it may undergo effective cooling in said first charge air cooler, the compressed air cannot be cooled to a temperature below the temperature of the cooling air flow within the tubular casing. Since it is often desirable to cool the exhaust gases to a temperature in the vicinity of the temperature of the surroundings, it is advantageous to use a second charge air cooler for subjecting the compressed air to a second step of cooling. With advantage, the second charge air cooler is so situated that it has air at the temperature of the surroundings flowing through it. In this case the second charge air cooler may be situated upstream of the first cooling element with respect to the intended direction of air flow through the first cooling element. The cooling of the coolant in the first cooling element is thus somewhat impaired, since the cooling air flow which cools the coolant in the first cooling element will be at a somewhat raised temperature, but the temperature rise of the cooling air flow is relatively moderate, since the compressed air reaching the second charge air cooler will not be at a relatively low temperature, having already undergone the first step of cooling.

According to another preferred embodiment of the invention, the tubular casing defines a flow passage which comprises an inlet aperture and one or more outlet apertures. The inlet aperture may be arranged close to the first cooling element to ensure that all the air which passes through the first cooling element is led into the flow passage defined by the tubular casing. Said further cooling element is with advantage situated close to the outlet aperture or apertures of the tubular casing. It is also possible for a plurality of elements, e.g. an EGR cooler and a charge air cooler, to be situated one after another in the tubular casing or in parallel, e.g. close to an outlet aperture.

According to another preferred embodiment of the invention, the cooler arrangement comprises flow-limiting means adapted to preventing air from passing through the flow passage in particular situations. The presence of such a flow passage inevitably results in air being pushed through the flow passage against a certain resistance. This usually leads to a vehicle with such a flow passage being subject to a somewhat heightened air resistance during operation. In certain operating states when the air flow through the flow passage is not necessary, said flow-limiting devices may be activated to block the air flow through the flow passage. The result during operation of the vehicle is that the air led towards a front portion of the vehicle will flow round the vehicle, making it possible in many cases to reduce the vehicle's air resistance and save fuel. Said flow-limiting devices may comprise a plurality of slatlike elements arranged in parallel and pivotable between a blocking position which prevents air from passing through the flow passage and a non-blocking position which allows air to pass through the flow passage. Such a louver-like configuration is a relatively easy way of stopping/resuming the air flow through the flow passage. Said flow-limiting devices may of course be configured in some other way.

BRIEF DESCRIPTION OF THE DRAWING

A preferred embodiment of the invention is described below by way of example with reference to the attached drawing in which:

The FIGURE depicts a cooler arrangement in a vehicle according to an embodiment of the present invention.

DETAILED DESCRIPTION OF A PREFERRED EMBODIMENT OF THE INVENTION

The FIGURE depicts an arrangement for recirculation of the exhaust gases of a supercharged combustion engine in a vehicle 1. The combustion engine is here exemplified as a diesel engine 2. Such recirculation is usually called EGR (exhaust gas recirculation). Adding exhaust gases to the compressed air which is led to the cylinders of the engine lowers the combustion temperature and hence also the content of nitrogen oxides ($NO_x$) which are formed during the combustion processes. The diesel engine 2 may be intended to power a heavy vehicle 1. The exhaust gases from the cylinders of the diesel engine 2 are led via an exhaust manifold 3 to an exhaust line 4. The exhaust gases in the exhaust line 4, which are at above atmospheric pressure, are led to a turbine 5. The turbine 5 is thus provided with driving power which is transmitted via a connection to a compressor 6. The compressor 6 thereupon compresses air which is led via an air filter 7 into an inlet line 8. A first charge air cooler 9a and a second charge air cooler 9b are arranged in the inlet line 8 to subject the compressed air to two steps of cooling before it is led to the diesel engine 2.

An arrangement for recirculation of part of the exhaust gases in the exhaust line 4 comprises a return line 11 which extends between the exhaust line 4 and the inlet line 8. The return line 11 comprises a EGR valve 12 by which the exhaust flow in the return line 11 can be shut off. The EGR valve 12 may also be used for steplessly controlling the amount of exhaust gases which is led from the exhaust line 4 to the inlet line 8 via the return line 11. A control unit 13 is adapted to controlling the EGR valve 12 on the basis of information about the current operating state of the diesel engine 2. The control unit 13 may be a computer unit provided with suitable software. The return line 11 comprises a first EGR cooler 15a for subjecting the exhaust gases to a first step of cooling and a second EGR cooler 15b for subjecting the exhaust gases to a second step of cooling. In certain operating states of supercharged diesel engines 2, the pressure of the exhaust gases in the exhaust line 4 will be lower than the pressure of the compressed air in the inlet line 8. In such operating states, it is not possible to mix the exhaust gases in the return line 11 with the compressed air in the inlet line 8 without special auxiliary means. To this end it is possible to use, for example, a venturi 16. If the combustion engine 2 is instead a supercharged Otto engine, the exhaust gases in the return line 11 can be led directly into the inlet line 8, since in substantially all operating states of an Otto engine the exhaust gases in the exhaust line 4 will be at a higher pressure than the compressed air in the inlet line 8. When the exhaust gases have mixed with the compressed air at the venturi 16 in the inlet line 8, the mixture is led via a manifold 17 to the respective cylinders of the diesel engine 2. The diesel engine 2 is cooled in a conventional manner by a cooling system which contains a circulating coolant. The coolant is cooled in a cooling element 20 fitted close to a forward portion of the vehicle 1.

A radiator fan 10 is adapted to generating an air flow through the cooling element 20 to cool the circulating coolant. The radiator fan 10 is enclosed in a tubular casing 21 which serves as a flow passage 22 for the air flow. The flow passage 22 has here an inlet aperture 22a and two outlet apertures 22b, c. The cooling element 20 is arranged close to the inlet aperture 22a. The first charge air cooler 9a is arranged close to a first outlet aperture 22b. The first EGR cooler 15a is arranged close to a second outlet aperture 22c. The second charge air cooler 9b is arranged in a peripheral region A of the vehicle 1, which in this case is at a front portion of the vehicle 1. The compressed air is thus cooled in the second charge air cooler 9b by air which is at the temperature of the surroundings. The second EGR cooler 15b is also arranged in the peripheral region A of the vehicle 1. The returning exhaust gases are thus cooled in the second EGR cooler 15b likewise by air which is at the temperature of the surroundings. The second charge air cooler 9b and the second EGR cooler 15b are arranged upstream of the cooling element 20 with respect to the intended direction of air flow.

A first flow-limiting device 23a is arranged in a portion of the flow passage 22 in the vicinity of the first outlet aperture 22b, and a second flow-limiting device 23b is arranged in a portion of the flow passage 22 in the vicinity of the second outlet aperture 22b. The flow-limiting devices 23a, b, each comprise a plurality of slatlike elements arranged in parallel and pivotable between an open position in which they are substantially parallel with the main direction of air flow and a blocking position in which they are substantially perpendicular to the main direction of air flow and thereby prevent air from flowing out through the respective outlet apertures 22b, c. The control unit 13 is adapted to regulating the flow-limiting devices 23a, b by means of respective schematically depicted switching devices 24a, b.

During operation of the diesel engine 2, the exhaust gases in the exhaust line 4 drive the turbine 5 before they are led out to the surroundings. The turbine 5 is thereby provided with driving power which drives the compressor 6. The compressor 6 compresses air which is led via the air filter 7 into the inlet line 8. The compression of the air also raises its temperature. The compressed air is cooled first in the first charge air cooler 9a arranged within the flow passage 22 close to the first outlet aperture 22b. During operation of the diesel engine 2, the radiator fan 10, in combination with the motion of the vehicle 1, generates an air flow which passes initially through the second charge air cooler 9b, the second EGR cooler 15b and the cooling element 20. The air is thereafter led in through the inlet aperture 22a of the flow passage 22. At this stage the air is at a raised temperature relative to the surroundings, since it has been used for cooling the media in the cooling elements 9b, 15b, 20 situated upstream, but is usually at a definitely lower temperature than the compressed air in the first charge air cooler 9a. Thus the compressed air can be subjected to a first step of cooling by the air which flows through the first charge air cooler 9a. The compressed air is thereafter led to the second charge air cooler 9b, in which it is subjected to a second step of cooling by air at the temperature of the surroundings, thereby cooling the compressed air to a temperature only a few degrees above the temperature of the surroundings.

In most operating states of the diesel engine 2, the control unit 13 keeps the EGR valve 12 open so that part of the exhaust gases in the exhaust line 4 is led into the return line 11. The exhaust gases in the exhaust line 4 are usually at a temperature of about 500-600° C. when they reach the first EGR cooler 15a. The first EGR cooler 15a is arranged within the tubular casing 21 close to the second outlet 22c. The cooling air flow here is thus at a temperature which is higher than the surroundings but definitely lower than the temperature of the exhaust gases in the first EGR cooler 15a. This air flow can therefore be used for subjecting the returned exhaust gases to a first step of cooling. The returning exhaust gases can thus be subjected to a first step of cooling to a temperature in the vicinity of the temperature of this air, which may be in the range 70-90° C. The exhaust gases are thereafter led to the second EGR cooler 15b situated in the peripheral region A of the vehicle alongside the second charge air cooler 9b. The second EGR cooler 15b is thus assured of having air at the temperature of the surroundings flowing through it. With a suitably dimensioned second EGR cooler 15b the returned exhaust gases can be cooled by the air flow to a temperature substantially corresponding to the temperature of the surroundings. Exhaust gases in the return line 11 can thus undergo cooling to substantially the same temperature as the compressed air in the second charge air cooler 9b. The cooled air from the cooler 9b and the cooled exhaust gases from the cooler 15b mix at the venturi at 16 and enter the inlet line 8. The mixture of the cooled exhaust gases and the compressed air is thereafter led to the respective cylinders of the diesel engine 2 via the inlet line 8 and the manifold 17.

Since both the recirculating exhaust gases and the compressed air are at a relatively high temperature, they can be cooled almost as effectively by air which is at a somewhat raised temperature after it has passed through the first cooling element 20 as by air at the temperature of the surroundings. The compressed air thus undergoes a first step of effective cooling in the first charge air cooler 9a and the recirculating exhaust gases undergo a first step of effective cooling in the first EGR cooler 15a. The fact that the first charge air cooler 9a and the first EGR cooler 15a are situated downstream of the first cooling element 20 means that the first step of cooling of the compressed air and the exhaust gases has relatively little effect on the cooling of the coolant in the first cooling element 20 and hence on the cooling of the combustion engine 2. Since it is often desirable to cool the compressed air and the recirculating exhaust gases to a temperature in the vicinity of the temperature of the surroundings, it is advantageous to use a second charge air cooler 9b and a second EGR cooler 15b for subjecting the compressed air and the recirculating exhaust gases respectively to a second step of cooling. For practical reasons, the second charge air cooler 9b and the second EGR cooler 15b are here situated upstream of the first cooling element 20 with respect to the intended direction of air flow through the first cooling element. This inevitably somewhat impairs the cooling of the coolant in the first cooling element 20, since the cooling air flow which cools the coolant in the first cooling element 20 will acquire a somewhat raised temperature, but the temperature rise of the cooling air flow is relatively moderate, since the compressed air reaching the second charge air cooler 9b and the recirculating exhaust gases reaching the second EGR cooler 15b will not be at a particularly high temperature, having already undergone a first step of cooling.

In certain operating states in which there is no need for the compressed air to be cooled in the first charge air cooler 9a and/or no need for the recirculating exhaust gases to be cooled in the first EGR cooler 15a, the control unit 13 may activate the flow-limiting devices 23a, b. Air is prevented from flowing out through the outlet apertures 22b, c so that the air flow through the flow passage 22 is halted. The air which during operation of the vehicle flows towards a front portion of the vehicle will therefore flow round the vehicle, which in many cases may reduce the vehicle's air resistance and save fuel. Said flow-limiting devices comprise here louvre-like configurations with a plurality of slatlike elements arranged in parallel and pivotable between a blocking position which prevents air from passing through the flow passage and a non-blocking position which allows air to pass through the flow passage.

The invention is in no way limited to the embodiments described with reference to the drawing but may be varied freely within the scopes of the claims. The tubular casing 21 may, for example, have any desired number of inlet apertures and outlet apertures. Both an EGR cooler and a charge air cooler may be arranged within the tubular casing close to one and the same outlet aperture. The tubular casing 21 need not contain both an EGR cooler and a charge air cooler but only one of said coolers.

The invention claimed is:

1. A cooler arrangement in a vehicle powered by combustion engine, the cooler arrangement comprising:
   a first cooling element positioned and configured to cool a circulating coolant fluid;
   a radiator fan configured and operable to generate an air flow through the first cooling element for cooling the coolant circulating through the first cooling element;
   a tubular casing configured as a flow passage for air and positioned to lead air which has passed through the first cooling element;
   at least one further cooling element for cooling a second medium, the further cooling element being arranged in the flow passage at a position downstream of the first cooling element with respect to a direction of flow of the air through the flow passage; and
   flow-limiting devices configured and operable to be set to a blocking position so as to prevent air from passing through the flow passage to the at least one further cooling element and to be set to a non-blocking position allowing air flow to the at least one further cooling element.

2. The cooler arrangement according to claim 1, further comprising:
   the combustion engine;
   an inlet line positioned and configured to lead air to the combustion engine;
   an exhaust line positioned and configured to lead exhaust gases from the engine;
   the at least one further cooling element comprising:
   an air-cooled EGR cooler configured and operable for cooling recirculating exhaust gases; and
   a connection positioned and configured to lead the recirculating exhaust gases from the EGR cooler to the inlet line of the combustion engine.

3. The cooler arrangement according to claim 2, wherein the air-cooled EGR cooler is configured and operable to subject the recirculating exhaust gases to a first step of cooling, and
   the cooler arrangement further comprises:
   a second EGR cooler configured and operable to subject the recirculating exhaust gases to a second step of cooling, and
   a connection configured to lead the recirculating exhaust gases from the first EGR cooler to the second EGR cooler.

4. The cooler arrangement according to claim 3, wherein the second EGR cooler is situated upstream of the first cooling element with respect to the direction of the air flow through the first cooling element.

5. A cooler arrangement according to claim 1, further comprising:
   an air compressor configured to compress air;
   the at least one further cooling element comprises an air-cooled charge air cooler configured and operable for cooling the compressed air; and
   a connection positioned and configured to lead the cooled compressed air from the charge air cooler to the inlet line of the combustion engine.

6. The cooler arrangement according to claim 5, wherein the air-cooled charge air cooler is configured and operable for subjecting the compressed air from the compressor to a first step of cooling; and
   the cooler arrangement further comprises a second air-cooled charge air cooler downstream of the charge air cooler in a flow of compressed air, the second charge air cooler is configured and operable for subjecting the compressed air to a second step of cooling.

7. The cooler arrangement according to claim 6, wherein the second charge air cooler is situated upstream of the first cooling element with respect to the direction of the flow of the cooling air through the first cooling element.

8. The cooler arrangement according to claim 1, wherein the tubular casing is configured and operable to define a flow passage comprising an inlet aperture and one or more outlet apertures.

9. The cooler arrangement according to claim 1, wherein the flow-limiting devices comprise a plurality of slatlike elements arranged in parallel and being together pivotable between the blocking position preventing air from passing through the flow passage and the non-blocking position allowing air to pass through the flow passage.

10. The cooler arrangement according to claim 3, further comprising an air compressor for configured to compress air;
    wherein the at least one further cooling element comprises an air-cooled charge air cooler configured and operable for cooling of compressed air; and
    a connection positioned and configured to lead the cooled compressed air from the charge air cooler to the inlet line of the combustion engine.

11. The cooler arrangement according to claim 10, wherein the air-cooled charge air cooler is positioned and configured to subject the compressed air from the compressor to a first step of cooling, and
    the cooler arrangement further comprises a second air-cooled charge air cooler downstream of the charge air cooler in a direction of flow of compressed air, the second charge air cooler is positioned and configured to subject the compressed air to a second step of cooling.

12. The cooler arrangement according to claim 3, wherein the tubular casing is positioned and configured to define a flow passage which comprises an inlet aperture and one or more outlet apertures;
    wherein the first cooling element is positioned toward the inlet aperture and the EGR cooler is positioned toward one of the outlet apertures.

13. The cooler arrangement according to claim 10, wherein the tubular casing is positioned and configured to define a flow passage which comprises an inlet aperture and one or more outlet apertures;
    wherein the first cooling element is positioned toward the inlet aperture and the charge air cooler is positioned toward one of the outlet apertures.

14. The cooler arrangement according to claim 8, wherein the first cooling element is positioned toward the inlet aperture and the further cooling elements are positioned toward the outlet aperture.

15. The cooler arrangement of claim 10, wherein the flow-limiting devices comprise:
    a first flow-limiting device positioned and configured to be pivotable between the blocking position preventing the air flow to the air-cooled charged air cooler and the non-blocking position allowing the air flow to the air-cooled charge air cooler; and
    a second flow-limiting device positioned and configured to be pivotable between the blocking position preventing the air flow to the air-cooled EGR cooler and the non-blocking position allowing the air flow to the air-cooled EGR cooler.

16. The cooler arrangement of claim 15, wherein the first flow limiting device is pivotable between the blocking position and the non-blocking position independently of the second flow limiting device.

17. The cooler arrangement of claim 15, wherein the air-cooled charge air cooler is positioned at a first outlet aperture of the tubular casing and the air-cooled EGR cooler is positioned at a second outlet aperture of the tubular casing different from the first outlet aperture.

* * * * *